Figure 1:
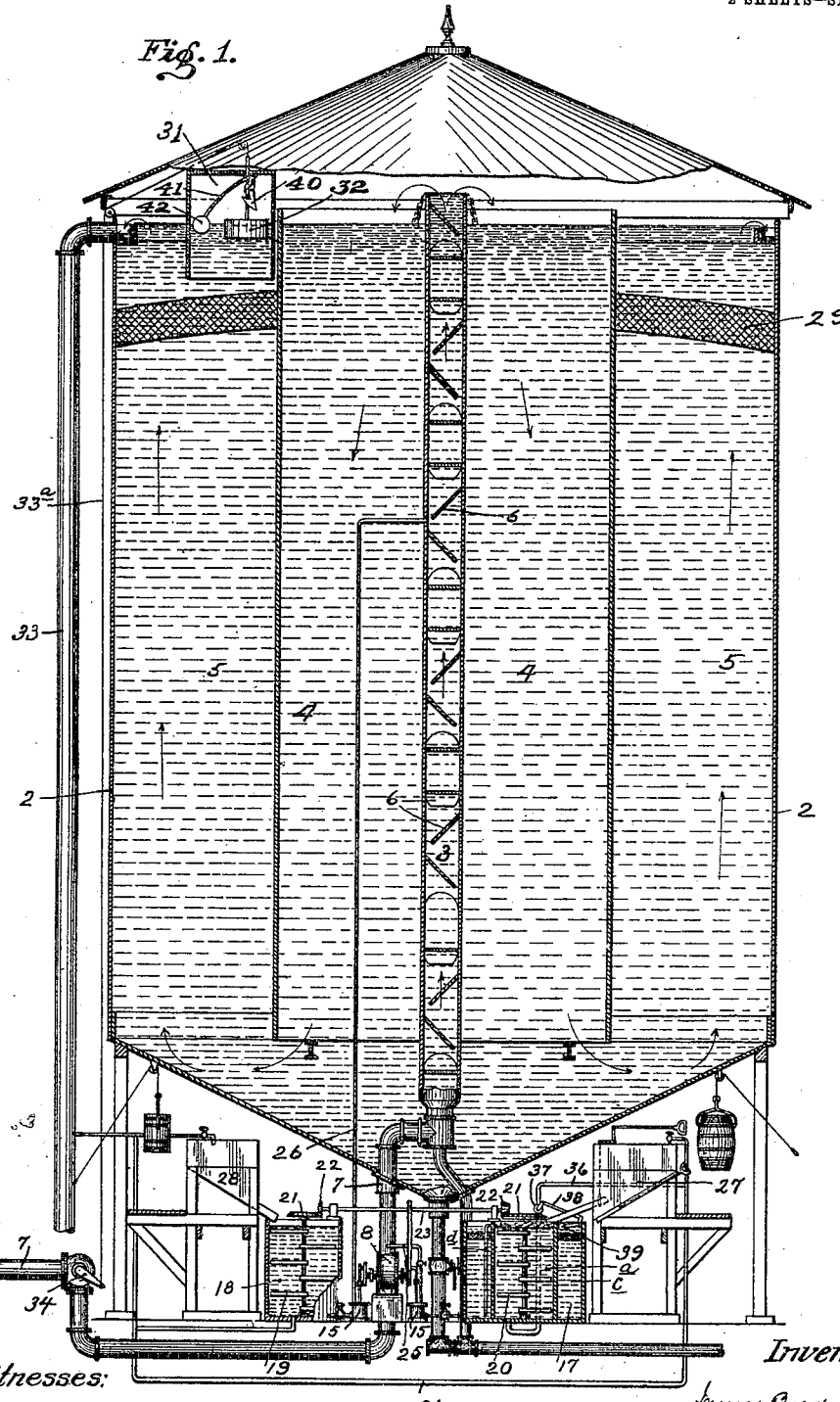

No. 838,535. PATENTED DEC. 18, 1906.
J. B. GREER.
APPARATUS FOR PURIFYING WATER.
APPLICATION FILED JAN. 5, 1905.

2 SHEETS—SHEET 1.

Witnesses:

Inventor:

By.
his Attorney.

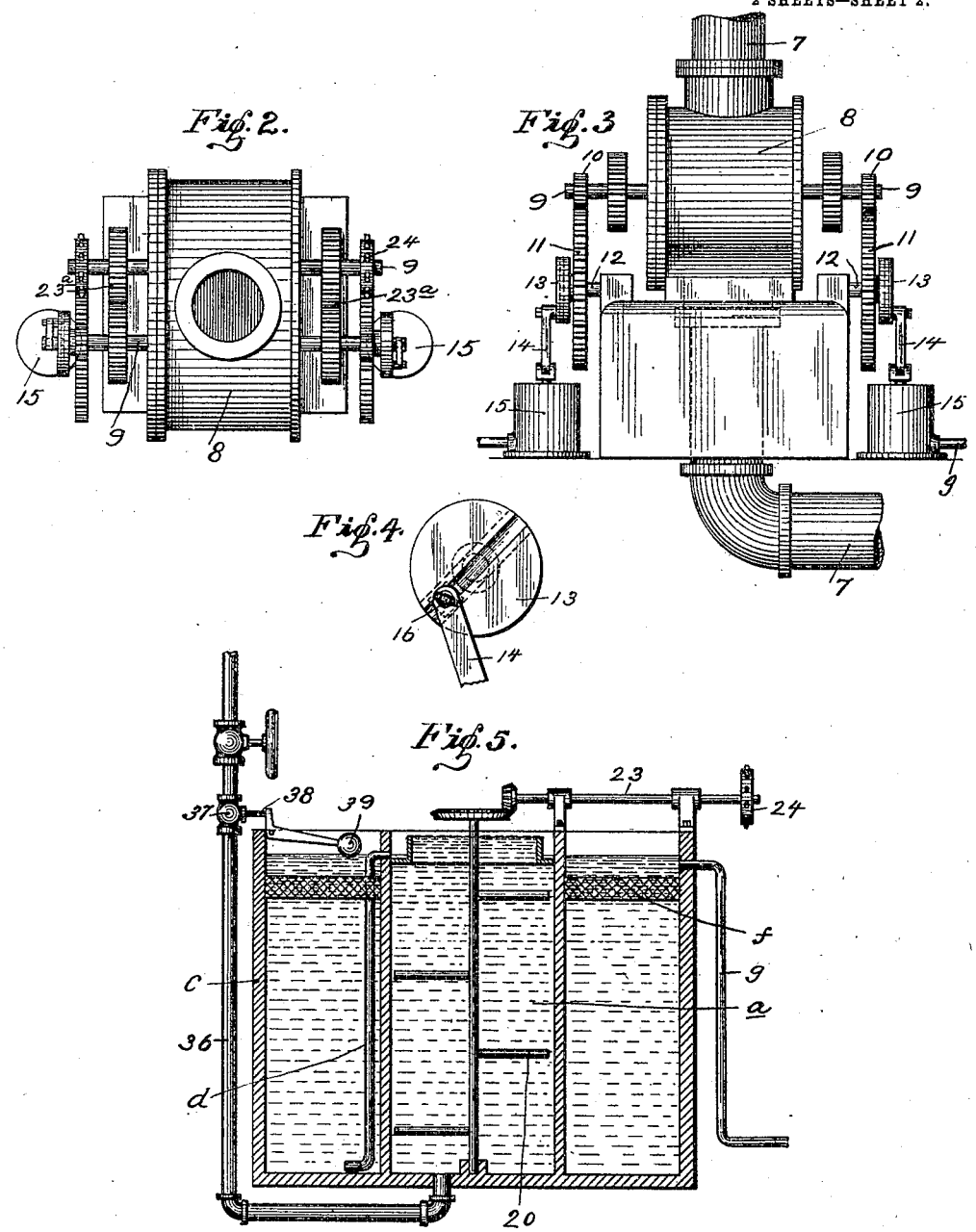

UNITED STATES PATENT OFFICE.

JAMES BOYD GREER, OF PITTSBURG, PENNSYLVANIA, ASSIGNOR TO GREER FILTER COMPANY, OF PHILADELPHIA, PENNSYLVANIA, A CORPORATION OF PENNSYLVANIA.

APPARATUS FOR PURIFYING WATER.

No. 838,535.　　　　Specification of Letters Patent.　　　　Patented Dec. 18, 1906.

Application filed January 5, 1905. Serial No. 239,711.

*To all whom it may concern:*

Be it known that I, JAMES BOYD GREER, of the city of Pittsburg, in the county of Allegheny and State of Pennsylvania, have invented a certain new and useful Improvement in Apparatus for Purifying Water, of which the following is a full, clear, and exact description, reference being had to the accompanying drawings, forming part of this specification, in which—

Figure 1 is a vertical sectional view showing my improvement. Fig. 2 is a plan view of the motor and pumps. Fig. 3 is an elevation of the same. Fig. 4 is a detached view of the adjusting device by means of which the pitman of the pump is connected with the crank-lever disk, and Fig. 5 is a vertical sectional view of the mixer.

Like symbols of reference indicate like parts wherever they occur.

My invention relates to that class of apparatus for softening water in which the lime contained in the water is removed by precipitation by mixing with the water a solution of oxid of lime, which changes the soluble bicarbonate of lime in the water to carbonate of lime, and also by mixing a soda solution with the water to be softened, which changes the sulfate of lime into hydrate of lime, which hydrate acts on the bicarbonate of lime in the water and forms a precipitate consisting of carbonate of lime.

The object of my invention is to cause a thorough mixture of the water to be purified with the purifying solutions and the regulation of the supply of these reagents to the water, so that a complete purification and softening of the water may be accomplished, as is hereinafter more fully set forth.

I will now describe my invention, so that others skilled in the art may manufacture and use the same.

In the drawings, 2 represents the purifying-tank, within which the raw water is mixed with the purifying and softening reagents and is then separated therefrom and from the precipitate formed thereby, so that the pure and softened water may be drawn from the top of the tank, while the precipitate is drawn or removed from the bottom of the same.

In order to cause, first, a thorough mixing of the reagent solutions with the raw water; second, a complete separation between the water and the precipitate formed by the reagents, and, third, the removal of the purified and softened water free from percipitate and other impurities, I divide the tank 2 into three portions or chambers: first, a central mixing conduit or chamber 3, which may be in the form of a vertical cylinder extending up through the central portion of the tank 2 to a point above the normal level of the water in the body of the tank, where it opens to permit the overflow of the water from the chamber 3; second, a precipitating-chamber 4, surrounding the chamber 3 and into which the chamber 3 overflows. This chamber 4 is open at the top and bottom, and it opens at its base into the third chamber 5, which is formed by the walls of the tank 2. Within the chamber 3 are baffle or agitating plates 6, the purpose of which is to cause a thorough mixture of the raw water and the purifying and precipitating reagents as they pass upwardly through the mixing-chamber, thus bringing the raw water in thorough contact with the reagents.

Opening into the bottom of the chamber 3 is a raw-water pipe or conduit 7, which leads to this chamber from the source of supply. Situate below the tank 2 within the course of the conduit 7 and in the path of the water under pressure therein is a water-motor 8, which is shown in detail in Figs. 3 and 4 and may be of any suitable construction—that is, being provided with any operative means adapted to be operated by the flow of the water and to cause the shafts 9 to rotate. On the ends of one of the power-shafts 9 are pinions 10, which gear with gear-wheels 11, mounted on the shafts 12. Keyed to the shafts 12 are the crank-disks 13, to which are adjustably secured the pitmen 14 of the pumps 15, the adjustment being formed by a sliding nut adapted to travel in a groove in the face of the disk and to be secured by a thumb-screw 16, Fig. 4. This enables the stroke of the pumps to be so regulated as to cause a greater or less proportion of reagents to be supplied to the water in the tank 2. At the sides of the motor 8 are the lime-mixing tank 17 and the soda-mixing tank 18, one of the pumps 15 being connected with the soda-tank, and the other pump being connected with the lime-solution tank by suitable pipes provided with closing and opening valves. Within these tanks are the agitators 19 and 20, adapted to be operated by beveled gearing 21, to which motion is imparted by means of spur-wheels 22 on the shaft 23, which shaft is operated by a sprocket extending from a sprocket-wheel connected with the motor to a sprocket-wheel 24, keyed to the other of the power-shafts 9. The two power-shafts 9 are connected by gear-wheel 23ª. By means of this arrangement the raw water as it passes into the mixing-chamber 3 operates the pumps, which draw the lime and soda water from the mixing-tanks and deliver the same to the water passing to the mixing-chamber 3. I prefer to cause the pipe 25, leading from the lime-solution pump 15, to enter the raw-water conduit 7 directly above the pump, and the pipe 26, leading from the soda-solution pump, to enter the chamber 3 at a point a little above its middle portion, so that the raw water is caused to mix with the lime solution before it enters the chamber 3 and during its passage through a portion of the same before the soda solution is brought in contact therewith.

The lime-mixing tank 17 is shown in section in Fig. 5, and it is formed in two parts separated from each other, the central tank or vessel $a$ containing the agitator and having the inlet-pipe 36, which leads from the pure-water conduit 33 and enters the base of the tank. Surrounding the central tank $a$ is an outer tank $c$, which communicates with the tank $a$ by an overflow-pipe $d$, which leads from the upper portion of the tank $a$ to the bottom of the tank $c$. At the upper portion of the tank $c$ is a filter $f$, through which the solution of lime must pass before it passes by the pipe $g$ to the pump 15. The soda-mixing vessel may be of the same construction as the lime-tank, or it may be a single tank containing an agitator.

Situate at one side of the lime-solution tank 17 is a lime-slaking box or vessel 27, in which the lime is slaked before it passes into the lime-mixer tank $a$, and at the side of the soda-tank 18 is a chamber 28, in which the soda is placed before it passes into the soda-mixing chamber 18. The water-supply to the chambers 27 and 28 is preferably drawn from a pure-water supply—that is, from water which has passed through the tank 2 and has been purified and softened.

It should be noticed that the pipe $g$, leading from the lime-agitator tank 17 to the pump 15, leads from the agitator-tank at the upper portion of the same above the filter $f$. It should also be noticed that the pipe or conduit 36, which supplies pure water to the agitator-tank, enters the same at the base thereof. The consequence of this is that a pure solution is drawn from the lime-tank and pure water is supplied thereto for the purpose of making the solution. Within the pipe 36 is a valve 37, provided with a lever 38, which is connected with a float 39 in the upper portion of the agitator-tank. By means of this whenever the lime-agitator tank becomes full the flow of water thereto is automatically shut off.

At the upper portion of the chamber 5 is a filter 29, which may be composed of any suitable filtering material, and it is so arranged that the water which rises in this chamber shall be compelled to pass through the filter before it reaches the overflow-pipe 33, by means of which pipe the purified and softened water is drawn from the tank. At the top of the chamber 5 is a well 31, closed at the top and open at the bottom, in which is a float 32, adapted to float on the surface of the water in the well. Leading from the float 32 is a cord or chain 33ª, which passes over suitable blocks to a point outside of the tank 2 and down to a weighted lever 34. This lever 34 is connected with a valve arranged in the conduit 7. The float 32 is normally supported by a trigger 40, which engages with the float or with a projection extending from the rod thereof. This trigger is at one end of the bell-crank lever 41. A float 42 is at the other end of the lever. When the water in the tank 5 falls below the normal level, the float 42, sinking with the water, draws the trigger away from the float, permitting the float to fall suddenly and to pull on the cord 33ª. This opens the valve 34, allowing a larger supply of raw water to pass into the mixing-chamber 3. When the water rises, the floats 32 and 42 also rise, and the trigger 40 again engages with the float 32 in such a manner as to support the same. The purpose of the well is to prevent the operation of the float from being obstructed by the freezing of the water.

The operation of my improved apparatus is as follows: As the raw water passes through the conduit 7 into the motor 8 and from this into the mixing-chamber 3 it operates the motor and causes the same to pump the reagents—a solution of lime and a solution of soda—the one into the conduit 7 and the other into the mixing-chamber 3, so that as the water passes through the mixing-chamber 3 about the baffle-plates 6 it is thoroughly mixed with the reagents before it overflows from the upper portion of the mixing-chamber 3 into the settling or precipitating chamber 4. As the water and reagents mixed together flow from the upper portion of the mixing-chamber 3 into the precipitating or settling chamber 4 the precipitate settles to the bottom of the hopper-shaped base of the tank 2, from which it may from time to time be drawn off through the conduit 35.

The purified water passing down through the precipitating-chamber 4 and out at the base of the same passes up in the purifying-chamber 5, through the filter 29, and into the pure-water conduit 33, which conduit leads to the place where the water is to be used or stored.

Although I have described and shown apparatus of certain form—that is, shape, size, and arrangement—I do not desire to limit myself thereto, as the parts may be changed in shape, size, form, and arrangement without departing from my invention.

The advantages of my invention will be appreciated by those skilled in the art. The pumps being driven by the raw water passing into the purifying-tank, the amount of precipitating reagents supplied to the tank will at all times be regulated according to the rate of flow of the water, and whenever the flow ceases or lessens, owing to the tank 2 being full, the passage of the reagents also ceases or lessens through the slowing and stoppage of the pumps. This is a great advantage, as it renders the operation of the apparatus entirely automatic.

Another advantage of my improvement is that the agitators are driven by the motors which supply the reagents. This not only economizes power by the use of the water as a motive agent, but it also lessens the wear on the agitators, as the operation of the same is automatically stopped or slackened whenever the passage of reagents to the tank lessens or ceases.

Another advantage of my invention is that the flow of raw water to the tank is controlled by the amount of water within the tank and the withdrawal of the same therefrom.

Having thus described my invention, what I claim, and desire to secure by Letters Patent, is—

1. In apparatus for purifying water, the combination of a mixing-chamber, receptacles for containing the purifying reagents, a conduit directly connected to the mixing-chamber for supplying water under the pressure in said conduit to the mixing-chamber, a motor in the line of said conduit adapted to be operated by the pressure of the water in the conduit, apparatus adapted to be driven by said motor to cause a flow of reagents from said receptacles to the mixing-chamber proportional to the flow of water passing to said mixing-chamber through said conduit, a reservoir for the purified water, and devices located in said reservoir and adapted to be operated by the water therein to control the supply of raw water through said conduit and in consequence the amount of raw water and reagents supplied to the mixing-chamber; substantially as described.

2. In apparatus for purifying water, the combination of a mixing-chamber, receptacles for containing the purifying reagents, a conduit directly connected to the mixing-chamber for supplying water under the pressure in said conduit to the mixing-chamber, a motor in the line of said conduit and adapted to be operated by the pressure of the water in the conduit, agitators in said receptacles connected to the motor and driven thereby, apparatus adapted to be driven by said motor to cause a flow of reagents from said receptacles to the mixing-chamber proportional to the flow of water passing to said mixing-chamber through said conduit, a reservoir for the purified water, and devices located in said reservoir and adapted to be operated by the water therein to control the supply of raw water through said conduit and in consequence the amount or raw water and reagents supplied to the mixing-chamber, substantially as described.

3. In apparatus for purifying water, a purifying-tank having a float arranged in the top of said tank, a raw-water-supply pipe leading to the bottom of said tank and provided with a valve near the bottom of said tank, and a cord connected to the valve and to the float whereby a movement of the valve follows any variation in the level of the water within the tank, substantially as described.

4. In apparatus for purifying water, a purifying-tank having a float therein provided with a trigger, a raw-water-supply pipe leading to said tank and provided with a valve, and a second float connected to said valve and arranged to open and close the same with varying levels of water in the tank, substantially as described.

5. In apparatus for purifying water, a purifying-tank, a mixing-chamber arranged within the purifying-tank, having the inlet for raw water at its lower end and overflowing at its upper end into said purifying-tank, stationary baffle-plates arranged within the mixing-chamber, and conduits for supplying reagents to the water flowing into and through the mixing-chamber, substantially as described.

6. In apparatus for purifying water, the combination of a raw-water-supply pipe, a mixing-chamber supplied with raw water by said pipe, a pipe for supplying a solution of lime to said raw water before it reaches the mixing-chamber, and a conduit for supplying a soda solution to the mixing-chamber at a distance above the entrance of the raw-water-supply pipe, substantially as described.

In testimony whereof I have hereunto set my hand.

JAMES BOYD GREER.

Witnesses:
A. M. STEEN,
JAMES K. BAKEWELL.